United States Patent
Erlanger

(10) Patent No.: US 8,438,045 B2
(45) Date of Patent: ***May 7, 2013

(54) DATA PROCESSING SYSTEM FOR PROVIDING AN EFFICIENT MARKET FOR INSURANCE AND REINSURANCE

(75) Inventor: Michael David Erlanger, Westport, CT (US)

(73) Assignee: Marketcore.com, Inc., Greenwich, CT (US)

( * ) Notice: Subject to any disclaimer, the term of this patent is extended or adjusted under 35 U.S.C. 154(b) by 1718 days.

This patent is subject to a terminal disclaimer.

(21) Appl. No.: 10/427,519

(22) Filed: May 1, 2003

(65) Prior Publication Data

US 2003/0200125 A1 Oct. 23, 2003

Related U.S. Application Data

(60) Division of application No. 09/296,573, filed on Apr. 22, 1999, now Pat. No. 6,594,635, which is a continuation-in-part of application No. 09/178,400, filed on Oct. 24, 1998, now abandoned.

(51) Int. Cl.
G06Q 40/00 (2012.01)
G06Q 30/00 (2012.01)

(52) U.S. Cl.
USPC .............. 705/4; 705/37; 705/14.1; 705/14.25; 705/35; 705/38; 705/14.17; 705/14.28; 705/14.19

(58) Field of Classification Search .................. 705/4, 1, 705/14.1, 14.17, 14.28, 14.19, 38, 37
See application file for complete search history.

(56) References Cited

U.S. PATENT DOCUMENTS

| 4,677,552 A | 6/1987 | Sibley ........................... 364/408 |
| 4,750,119 A | 6/1988 | Cohen ............................. 705/14 |

(Continued)

FOREIGN PATENT DOCUMENTS

| EP | 0 434 224 | 6/1991 |
| EP | 0 512 702 | 11/1992 |

(Continued)

OTHER PUBLICATIONS

Quantity Discount—definition Collins Dictionary of Business—2006.*

(Continued)

*Primary Examiner* — James Trammell
*Assistant Examiner* — Daniel L Greene
(74) *Attorney, Agent, or Firm* — St. Onge Steward Jonston & Reens LLC

(57) ABSTRACT

A data processing system is disclosed that provides an efficient market for: (1) the provision of insurance and reinsurance between insurers and those seeking insurance and reinsurance, and (2) the sale of insurance between reinsurers. The data processing system provides an efficient market for the provisioning of insurance and reinsurance that not only invites insurers, insurance seekers, and reinsurers to patronize the system, but whose conventions induce them to patronize the system. An embodiment comprises: receiving at a data processing system an underwriting standard from each of a plurality of insurers; compiling a first set of statistics in the data processing system based on the underwriting standards from each of the plurality of insurers; and outputting from the data processing system the first set of statistics to a selected insurer at a price that is based on a measure of fees earned with respect to the selected insurer.

33 Claims, 4 Drawing Sheets

U.S. PATENT DOCUMENTS

| | | | | |
|---|---|---|---|---|
| 4,837,693 A * | 6/1989 | Schotz | 705/4 |
| 4,903,201 A | 2/1990 | Wagner | 705/37 |
| 4,980,826 A | 12/1990 | Wagner | 705/37 |
| 5,034,916 A | 7/1991 | Ordish | 709/204 |
| 5,077,665 A | 12/1991 | Silverman | 705/37 |
| 5,101,353 A | 3/1992 | Lupien | 705/37 |
| 5,193,056 A | 3/1993 | Boes | 705/36 R |
| 5,297,032 A | 3/1994 | Trojan | 705/37 |
| 5,327,508 A | 7/1994 | Deaton | 382/100 |
| 5,375,055 A | 12/1994 | Togher | 705/37 |
| 5,444,630 A | 8/1995 | Dlugos | 705/402 |
| 5,508,913 A | 4/1996 | Yamamoto | 705/37 |
| 5,537,315 A * | 7/1996 | Mitcham | 705/4 |
| 5,611,052 A | 3/1997 | Dykstra | 705/38 |
| 5,636,117 A | 6/1997 | Rothstein | 705/4 |
| 5,644,726 A | 7/1997 | Oppenheimer | 705/36 R |
| 5,655,085 A * | 8/1997 | Ryan et al. | 705/4 |
| 5,689,650 A | 11/1997 | McClelland | 705/36 R |
| 5,704,045 A | 12/1997 | King | 705/35 |
| 5,732,400 A * | 3/1998 | Mandler et al. | 705/26.44 |
| 5,742,775 A | 4/1998 | King | 705/38 |
| 5,774,883 A | 6/1998 | Anderson | 705/38 |
| 5,787,402 A | 7/1998 | Potter | 705/37 |
| 5,794,207 A | 8/1998 | Walker | 705/1 |
| 5,794,219 A | 8/1998 | Brown | 705/37 |
| 5,806,048 A | 9/1998 | Kiron | 705/36 R |
| 5,809,478 A | 9/1998 | Greco | 705/4 |
| 5,809,483 A | 9/1998 | Broka | 705/37 |
| 5,835,896 A | 11/1998 | Fisher | 705/37 |
| 5,845,265 A | 12/1998 | Woolston | 705/37 |
| 5,845,266 A | 12/1998 | Lupien | 705/36 R |
| 5,873,071 A | 2/1999 | Ferstenberg | 705/36 R |
| 5,878,403 A | 3/1999 | DeFrancesco | 705/38 |
| 5,884,286 A | 3/1999 | Daughtery | 705/36 R |
| 5,890,138 A | 3/1999 | Godin | 705/26 |
| 5,893,079 A | 4/1999 | Cwenar | 705/36 R |
| 5,895,454 A | 4/1999 | Harrington | 705/26 |
| 5,924,082 A | 7/1999 | Silverman | 705/37 |
| 5,940,812 A | 8/1999 | Tengel | 705/38 |
| 5,966,699 A | 10/1999 | Zandi | 705/38 |
| 5,995,947 A | 11/1999 | Fraser | 705/38 |
| 6,006,200 A | 12/1999 | Boies | 705/26 |
| 6,006,207 A | 12/1999 | Mumick | 705/38 |
| 6,026,364 A | 2/2000 | Whitworth | 705/36 R |
| 6,029,141 A | 2/2000 | Bezos | 705/27 |
| 6,049,782 A | 4/2000 | Gottesman | 705/36 R |
| 6,119,093 A * | 9/2000 | Walker et al. | 705/4 |
| 6,233,566 B1 | 5/2001 | Levine | 705/36 R |
| 6,876,992 B1 | 4/2005 | Sullivan | |
| 2004/0236698 A1 | 11/2004 | Sweeney | |

FOREIGN PATENT DOCUMENTS

| | | |
|---|---|---|
| EP | 0 895 173 | 2/1999 |
| GB | 1 489 571 | 10/1977 |
| JP | 10-312437 | 11/1998 |
| WO | WO 95/27945 | 10/1995 |
| WO | WO 97/08640 | 3/1997 |
| WO | WO 97/30407 | 8/1997 |
| WO | WO 97/45802 | 12/1997 |
| WO | WO 99/09470 | 2/1999 |
| WO | WO 99/13425 | 3/1999 |

OTHER PUBLICATIONS

Complie—definition—as downloaded from dictionary.com on Dec. 14, 2009.*

Volume Discount—definition—Farlex Financial Dictionary 2009.*

Netback—definition—as downloaded from Investopedia Dec. 16, 2009.*

Robert Mabro: Netback Pricing and the Oil Collapse of 1986, Oxford Institute for Energy Studies (1987).*

Lal, Compensation Plans for Single- and Multi-Product Salesforces: An Application of the Holmstrom-Milgrom Model, Management Science, vol. 39, No. 7 (Jul. 1993), pp. 777-793.*

"Internet Mortgage Aggregators Multiply," American Banker Further Banking Supplement (Dec. 1, 1997).

"Lenders Turn to Aggregate Sites: Online Markets Start to Emerge," Credit Risk Management Report (Jun. 29, 1998).

Bower, Jeffrey E.: Credit Scoring and Artificial Intelligence, ABA Bank Compliance (Jul. 1, 1998) pp. 37-42.

E-Loan.com, selected web pages from www.eloan.com (Apr. 11, 1999).

Fesharaki, Fereidun et al., "Adjustment of Worldwide Refining Capacity is Not Over Yet," Oil & Gas J. (Apr. 20, 1987).

On-line Mortgage Trading System Debuts, Business Wired (Oct. 1, 1997).

The Gale Group, CFI ProServices Announces a New Software Product That Simplifies Fair Lending, pp. 1-3 (Jun. 1, 1994).

GetSmart.com, selected pages from www.getsmart.com (Apr. 11, 1999).

Goss, John: We know Who You Are and We Know Where You Live: The Instrumental Rationality of Geodemographic Systems, Economic Geography (Apr. 1995).

Homeadvisor.com, selected web pages from www.homeadvisor.com (Apr. 11, 1999).

Homeshark.com, selected pages from www.homeshark.com (Apr. 11, 1999).

IMX, "IMX Mortgage Exchange develops secure technology to connect brokers and lenders,"ttp://corp.imx.com/corp/newsroom/press/97_10_01.asp (Oct. 1, 1997).

IMX (Industrywide Mortgage Exchange) "IMX Exchange Readies PowerTrade for Lenders," http://corp.imx.com/corp/newsroom/press/98_05_06.asp (May 6, 1998).

IMX Mortgage Exchange, "IMX Technology Solutions for Mortgage Industry" (undated, printed 2002).

Instinet: Instinet Trading, A Guide (1994).

Lendigtree.com, selected pages from www.lendingtree.com (Apr. 11, 1999).

Phillips Business Information, "Marketplace Profile: Network Vendor," Credit Risk Management Report (Jul. 27, 1998).

Meridien Research Inc., "Shifting Power to the Buy Side: Automating Fixed Income Markets" (Oct. 1999).

Mortgage.com, selected web pages from www.1stmtg.com (Apr. 11, 1999).

The Mortgage Professor's Website—The Different Types of Mortgage Web Sites, from www.mtgprofessor.com Jan. 11, 1999.

"The Mortgage Professor's Website—Summary Evaluation of Shopping Sites" and "Detailed Evaluation of Shopping Sites," from www.mtgprofessor.com, Nov. 17, 1998.

Muolo, Paul: "Farewell, Big Pond—Hello Startup," U.S. Banker vol. 108 No. 5 pp. 108-112 (May 1998).

"Netbacks Have Deeply Changed International Crude Oil Pricing," National Petroleum News (Jun. 1986).

Peters, Rich, "Risk-Based Pricing," Credit World (Mar. 1, 1993).

Priceline.com, selected pages from www.priceline.com (Apr. 11, 1999).

Quicken.com, selected pages from www.quicken.com (Apr. 11, 1999).

Reinbach, Andrew: The Bidding Wards: Mortgage Exchanges Force Commoditization, Bank Systems and Technology (Nov. 1996).

Tahmassebi, "Netback Deals Could Bring Some Stability to Oil Market," Oil & Gas J. (Jan. 20, 1996).

Wise, Christy, Three Strategies, Mortgage Banking (Apr. 1, 1998).

* cited by examiner

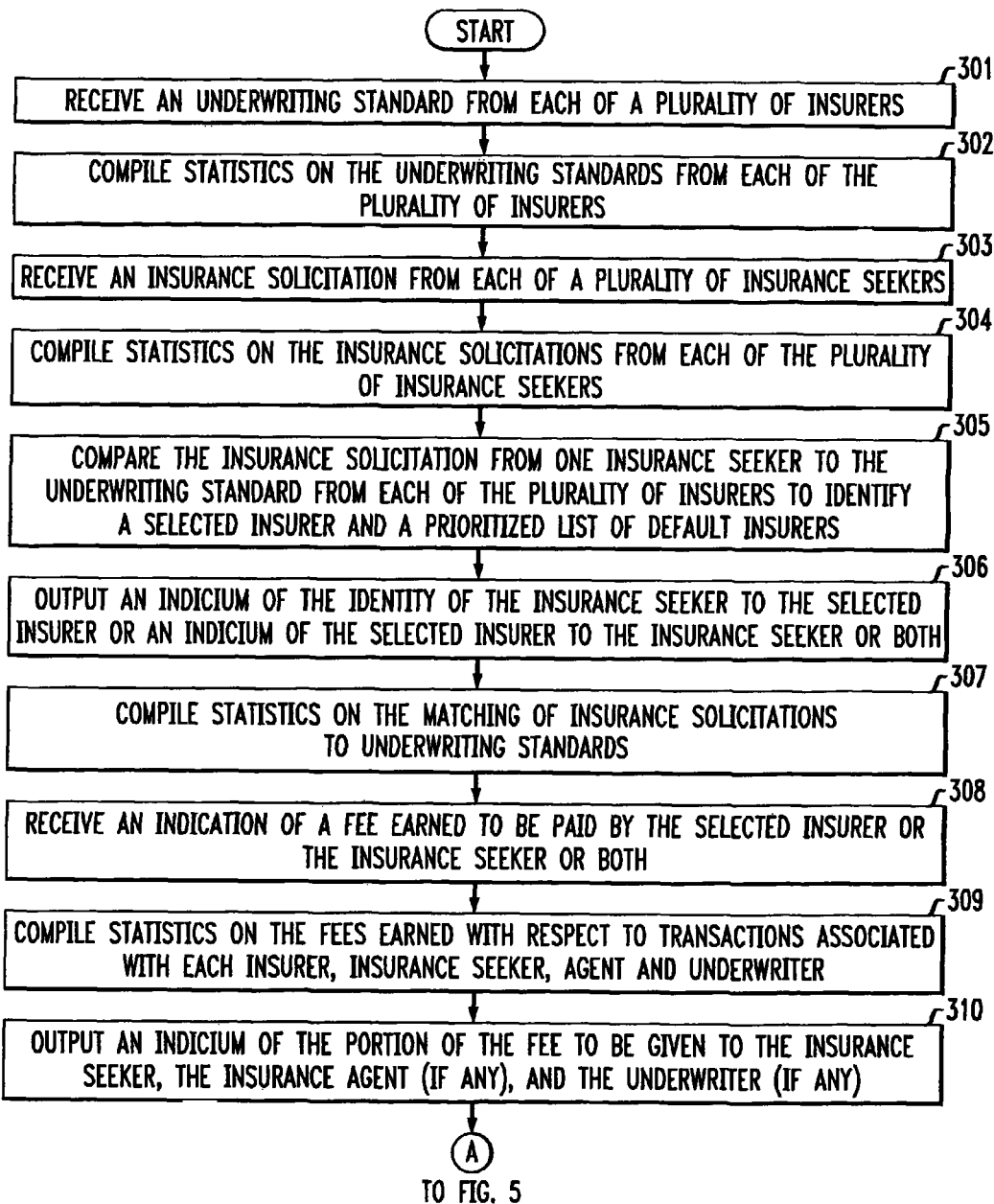

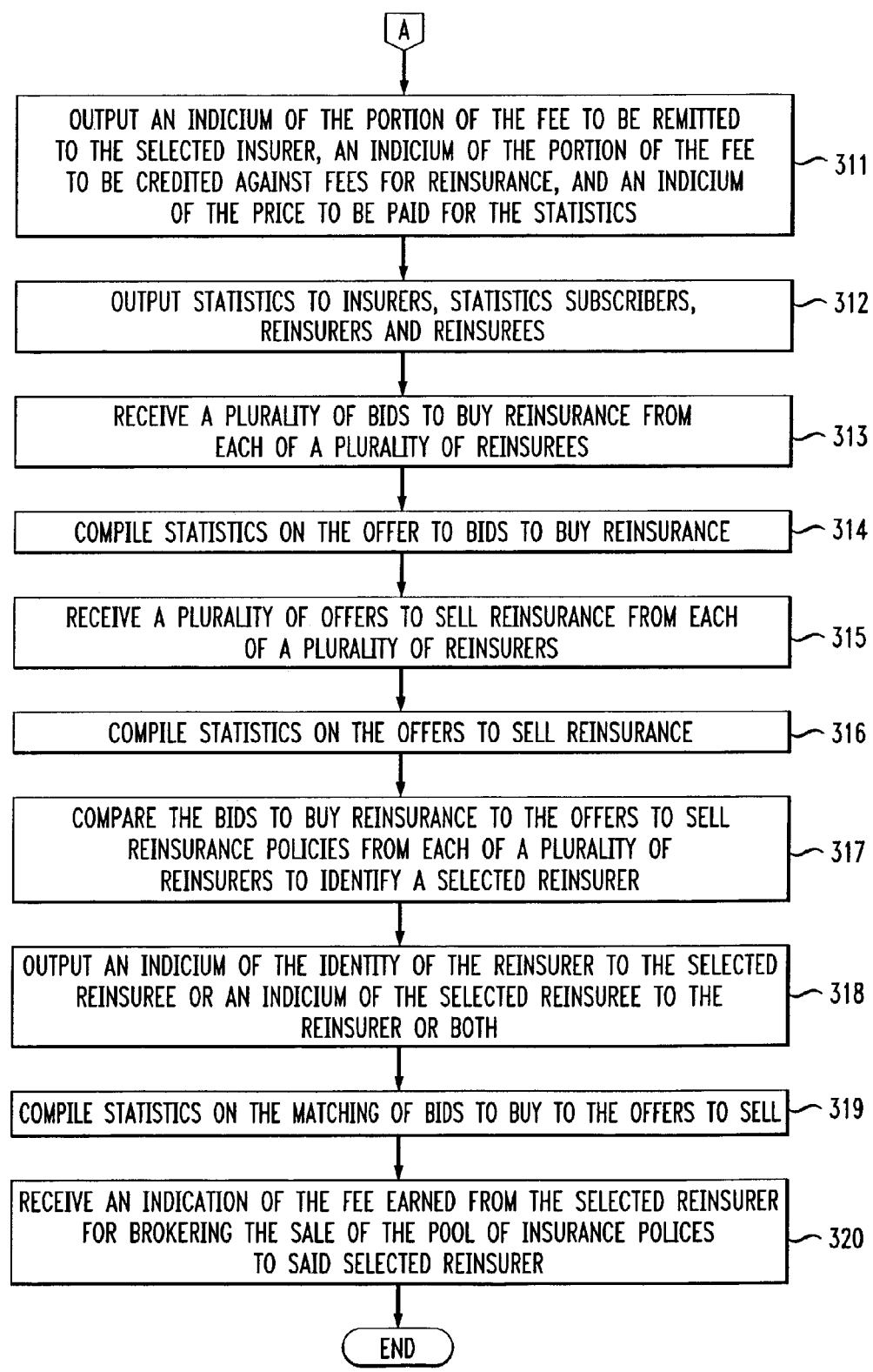

DATA PROCESSING SYSTEM FOR PROVIDING AN EFFICIENT MARKET FOR INSURANCE AND REINSURANCE

CROSS-REFERENCE TO RELATED APPLICATIONS

This application is a division of U.S. patent application Ser. No. 09/296,573, filed Apr. 22, 1999, now U.S. Pat. No. 6,594,635 which is a continuation-in-part of U.S. patent application Ser. No. 09/178,400, filed Oct. 24, 1998, now abandoned both of which are hereby incorporated by reference herein in their entirety.

FIELD OF THE INVENTION

The present invention relates to electronic commerce in general, and, more particularly, to a data processing system that provides an efficient market for: (1) the provision of insurance by insurers to those seeking insurance (the primary insurance market), and (2) the reinsurance of existing policies between reinsurers and reinsurers (the secondary insurance market).

BACKGROUND OF THE INVENTION

As anyone who has ever sought insurance knows (hereinafter an "insurance seeker"), it can be a challenge to find an insurer who is willing to offer insurance at a reasonable premium and on reasonable terms. Although the verity of this statement is clear for insurance seekers who are a poor risk, it is also true, albeit less obviously so, for those insurance seekers who are a good risk. For example, although many insurers may endeavor to provide some types of insurance, few insurers provide more than a small subset of all of the types of insurance offered by all of the insurers. One insurer may offer only homeowner's insurance for single-family dwellings while another only offers flood insurance for apartment dwellers. Therefore, even an insurance seeker who is a good risk may waste its time approaching insurers who do not offer the insurance product the insurance seeker desires.

Furthermore, even if an insurance seeker finds an insurer who does offer the desired insurance product, the insurance seeker is unlikely to know if that insurer is offering the insurance at a competitive premium and on competitive terms. Typically, there are three ways that an insurance seeker can remedy this.

First, the insurance seeker can contact (e.g., in person, on the telephone, etc.) numerous insurers and inquire into their premiums and terms for a particular insurance product. In fact, many people do precisely this when seeking automobile insurance because it is well known that the premiums, terms, fees and underwriting standards of different insurers vary widely. Although it clearly pays to shop around, even the most stalwart are unlikely to contact more than a dozen insurers because of the time and effort involved.

Second, the insurance seeker can consult newspapers and other periodicals that publish premiums and terms for a variety of insurers. Such listings are, however, unlikely to be comprehensive and are likely to be out-of-date, particularly in times when premiums and terms are changing rapidly. Furthermore, published premiums are often misleading because they apply only to those insurance seekers who are the best risks.

One factor that accelerates the perishability of premiums in newspapers and periodicals concerns insurers who discover that their published premiums and terms are not competitive. Typically, those insurers immediately change their premiums and terms, but because of the latency in the publication and dissemination of newspapers and periodicals those changes are not immediately widely-known.

Third, the insurance seeker can contact an "independent" insurance agent who represents a plurality of insurers. The independent insurance agent is not, however, necessarily motivated to provide the insurance seeker with the least expensive insurance product at the best terms but rather the insurance product that garners the agent the largest commission.

Regardless, when an insurance seeker has satisfied itself that it has found an insurer who offers the desired insurance product at a competitive premium and at reasonable terms, the insurance seeker must thereafter expend an indeterminate amount of time and energy to learn if it qualifies for the desired insurance product from that insurer. And although an insurance seeker may satisfy itself that it has located an insurer with the best premium and terms, that does not mean that it has, in fact, done so. There could be other insurers, unknown to the insurance seeker, who offer better premiums and terms who would accept the insurance seeker as an acceptable risk.

Furthermore, the insurer may decide that the insurance seeker does not qualify for the desired insurance, or that the insurance seeker, because of poor health, accidents in the past or other high-risk factors, does not qualify for the best premiums and terms, which are what brought the insurance seeker to that insurer in the first place. In either case, the insurance seeker may have wasted its time in approaching the insurer or may not receive the premium and terms that were anticipated.

The end result is that it can be difficult for those seeking insurance to find an insurer that is willing to offer the insurance product that the insurance seeker desires at a competitive premium and on competitive terms.

Perhaps surprisingly, it is even more difficult for each insurer to find a satisfactory number of potential customers (i.e., insurance seekers who are interested in and qualify for the insurer's insurance products). In fact, some insurers spend hundreds of millions of dollars per year on advertising to entice insurance seekers to their door only to learn that many do not qualify for a particular insurance product under the insurer's underwriting standards. This is extremely problematic for insurers because the money they spend on advertising, 800-numbers, insurance agents and underwriters must be recouped from the gross receipts of those products that actually sell, which increases the insurer's costs, pushes it's premiums up, makes it less competitive in the marketplace, and hinders its ability to attract insurance seekers. In other words, a portion of the premiums paid by insureds goes to pay for the insurer's costs in advertising and culling out insurance seekers who are an unacceptable risk. Therefore, an insurer could offer an insurance seeker who is an acceptable risk a lower premium if the insurer had numerous insurance seekers knocking on its door, all of whom were acceptable risks. Furthermore, the insurer's profits could still rise if its costs of doing business decreased faster than its premiums did.

In summary, not only do insurance seekers have difficulty locating an insurer that offers the insurance product sought at competitive premiums and on competitive terms, but it is also difficult for insurers to find large numbers of insurance seekers who are acceptable risks without having to spend large sums of money on advertising and culling out the unacceptable.

Therefore, the need exists for a mechanism that enables an insurance seeker to quickly and easily find an insurer that offers the insurance product that it desires at competitive premiums and on competitive terms and that also provides insurers with large numbers of acceptable insurance seekers at a reasonable cost.

SUMMARY OF THE INVENTION

The present invention is a data processing system that provides an efficient market for: (1) the provision of insurance between insurers and those seeking insurance, and (2) the reinsurance of existing policies. In particular, the data processing system provides an efficient market that not only invites insurers, insurance seekers, and reinsurers and reinsurees to patronize the system, but that induces them to patronize it as well.

The inducement is manifested in several ways. In the illustrative embodiment of the present invention, they include, but are not limited to:

For insurance seekers:
  the data processing system provides an insurance seeker with a single "one-stop-shopping" source that matches the insurance seeker to an insurer who offers the insurance product sought;
  the data processing system matches an insurance seeker to only those insurers who satisfy the insurer's underwriting standards; and
  the data processing system guarantees an insurance seeker that it is being offered the best premium or the best terms or both available from any insurer who patronizes the system (of those insurers who deem the insurance seeker an acceptable risk and who offer the insurance product sought).

For insurers:
  the data processing system provides those insurers who offer competitive premiums or terms or both with a large number of insurance seekers who the insurer deems are acceptable risks at a lower cost than in the prior art, which lowers the insurer's cost of doing business that, in turn, enables the insurer to offer even better premiums and terms;
  the data processing system provides those insurers who offer competitive premiums or terms or both with statistics regarding the market in insurance and reinsurance, which can be used by the insurers to: (1) determine which types of insurance they should offer and at what premiums and terms, (2) arbitrage those insurers who do not have access to the statistics, and (3) cost/value the insurance policies in their portfolio, which facilitates the reinsurance of those policies, which, in turn, increases their liquidity, distributes their risk, and lowers their cost of doing business; and
  the data processing system provides insurers with an efficient market for the purchase and sale of the servicing of policies (e.g., providing claims adjusting, premium collection, etc.).

For reinsurers and reinsurees
  the data processing system provides reinsurers and reinsurees with an efficient market for the reinsurance of existing policies; and
  the data processing system provides reinsurers and reinsurees with statistics regarding the market in insurance and reinsurance that are of value in: (1) assessing the cost/value of individual policies that are to be reinsured; (2) determining which policies they desire to reinsure and at what price, and (3) arbitraging those reinsurers and reinsurees who do not have access to the statistics.

These inducements are possible because it is recognized that the costs of doing business for insurers, reinsurers and reinsurees and the premiums and fees to insurance seekers are unnecessarily high largely because an efficient market for insurance and reinsurance does not exist. Furthermore, it is recognized that if a highly efficient market for insurance and reinsurance did exist, the cost of doing business for insurers, reinsurers and reinsurees could decrease, the premiums and fees to insurance seekers could decrease, and the provider of the market could still make a profit. Furthermore, the existence of an efficient market could even provide insurers with a larger profit than they make now if operating costs drop more quickly than premiums drop. In other words, the intermediation of an efficient market between insurers, insurance seekers, reinsurers and reinsurees can actually make the cost of insurance to insurance seekers go down, the cost of doing business to insurers, reinsurers and reinsurees go down and the profits to insurers, reinsurers and reinsurees to go up. Therefore, a data processing system in accordance with the illustrative embodiment endeavors to provide a market for the provision of insurance and reinsurance that is highly efficient.

It is also recognized that the efficiency of the market for insurance may be affected by the efficiency of the market in reinsurance and vice versa. Therefore, the illustrative embodiment of the present invention seeks to improve the efficiency in both the market for insurance and the market in reinsurance so that, to the extent the efficiency in one enhances the efficiency in the other, a synergy of efficiency between the markets is affected.

It is further recognized that merely providing a market and inviting insurers, insurance seekers, reinsurers and reinsurees to patronize it is, in and of itself, insufficient to yield an efficient market. The prerequisite to an efficient market is volume—in numbers of insurers, insurance seekers, reinsurers, reinsurees, and dollars transacted—and the prerequisite to volume is an efficient market. This is a Catch-22 that has, until now, stemmed the development of an efficient market in insurance and reinsurance.

To overcome this predicament, some data processing systems in accordance with the present invention might incorporate one or more mechanisms for priming an efficient market and for reinforcing the efficiency of the market. Three illustrative mechanisms are.

First, the pro rata fees from a patron for patronizing the system might decrease as the total fees earned from transactions associated with that patron increase. For example, although the system may receive a fee from an insurer when the insurer writes a policy with the assistance of the system, a portion of the fee may be remitted back to the insurer if the insurer transacts a large volume of business through the system in a given interval. Advantageously, the fees from all types of insurance products are aggregated for determining the amount of the remittance. An illustrative remittance schedule could be:

TABLE 1

Illustrative Remittance Schedule

| Total Fees Earned From Writing of Insurance With Respect to Patron In The Last Month (all insurance products) | % of Fee Earned To Be Remitted To Insurer |
| --- | --- |
| $0 to $250,000 | 0% |
| $250,001 to $500,000 | 5% |
| $500,001 to $1,000,000 | 15% |

TABLE 1-continued

Illustrative Remittance Schedule

| Total Fees Earned From Writing of Insurance With Respect to Patron In The Last Month (all insurance products) | % of Fee Earned To Be Remitted To Insurer |
|---|---|
| $1,000,001 to $5,000,000 | 35% |
| >$5,000,000 | 50% |

Therefore, this mechanism encourages insurers to patronize the system with larger, rather than smaller, volumes, which is accomplished by endeavoring to offer the most varieties of insurance at the lowest premiums and at the best possible terms.

Second, some or all of the parties who patronize the system might receive statistics compiled by the system on the condition of the market in insurance and reinsurance (i.e., a service analogous to the Bloomberg News Service or a stock ticker, etc). Although these statistics cost the data processing system little to compile, their value is so great that insurers, reinsurers and reinsurees who do not have access to the statistics will have difficulty, in the long run, in competing with those who do. An analogy makes the situation clear; a trader of stocks without access to the ticker and current bid and offer quotations can be arbitraged by a trader who does.

Furthermore, although some or all of the statistics may be sold for cash, the statistics are advantageously given for free, or sold at a subsidized price, to those patrons of the system who actually transact business through the system. Advantageously, price for the statistics decreases as the measure of fees earned from transactions associated with a patron increases. For the purposes of this specification, the provision of statistics for free, or at a subsidized price, to those patrons of the system who write policies or reinsure or both through the system is called "netbacking." An illustrative netbacking schedule could be:

TABLE 2

Illustrative Netbacking Schedule

| Total Fees Earned From Writing of Insurance With Respect to Patron In The Last Month (all insurance products) | Cost of Statistics to Patron |
|---|---|
| $0 to $250,000 | $1,000,000 |
| $250,001 to $500,000 | $750,000 |
| $500,001 to $1,000,000 | $250,000 |
| $1,000,001 to $5,000,000 | $100,000 |
| >$5,000,000 | $0 (free) |

This mechanism also encourages insurers to patronize the system with larger, rather than smaller, volumes, which is accomplished by endeavoring to offer the most varieties of insurance at the lowest premiums and at the best possible terms.

Third, a portion of the pro rata fees incurred by insurers for writing policies to insurance seekers with the assistance of the system might be credited against the fees incurred by those insurers who reinsure through the system (as either reinsurer or reinsuree or both). For example, many insurers who write policies immediately seek reinsurance (i.e., to transfer all, or a portion of, the risk associated with the policy to a reinsurer). It is, therefore, possible that an insurer will write a policy to an insurance seeker through the system, and incur a fee for doing so, and then reinsure that policy through the system and incur a second fee. The illustrative embodiment of the present invention credits, according to some credit schedule, a portion of the fees associated with a patron for writing insurance through the system against the fees incurred for reinsuring through the system. Such a credit schedule could be:

TABLE 3

Illustrative Credit Schedule

| Total Fees Earned From Writing of Insurance With Respect to Patron In The Last Month (all insurance products) | % of Fee Earned To Be Credited Against Reinsurance Fees |
|---|---|
| $0 to $250,000 | 0% |
| $250,001 to $500,000 | 5% |
| $500,001 to $1,000,000 | 10% |
| $1,000,001 to $5,000,000 | 20% |
| >$5,000,000 | 35% |

An alternative embodiment of the present invention works in reverse and credits, according to some schedule, a portion of the fees earned with respect to a patron in reinsuring through the system against the fees incurred by the patron in a transaction for writing insurance through the system. In yet another embodiment of the present invention the fees incurred in reinsuring through the system are credited against the fees for writing insurance through the system and the fees incurred writing insurance through the system are credited against the fees for reinsuring through the system.

Therefore, this mechanism also encourages insurers to patronize the system with larger, rather than smaller, volumes, which is accomplished by endeavoring to offer the most varieties of insurance at the lowest premiums and at the best possible terms, and by patronizing the market in reinsurance with the best possible bids and offers.

The end result is that in order to compete in the insurance markets insurers, reinsurers and reinsurees must have access to the statistics, which encourages them to patronize the system with competitive offerings to get access to the statistics, which increases the competitiveness of the market, increases its volume, and promotes its efficiency. Therefore, some embodiments of the present invention prime the market for efficiency and incorporate a positive feedback mechanism that maintains that efficiency. It is understood, however, that the priming of embodiments of the present invention may be accelerated by conventional advertising.

An embodiment of the present invention comprises: receiving at a data processing system an underwriting standard from each of a plurality of insurers; compiling a first set of statistics in the data processing system based on the underwriting standards from each of the plurality of insurers; and outputting from the data processing system the first set of statistics to a selected insurer at a price that is based on a measure of fees earned with respect to the selected insurer.

BRIEF DESCRIPTION OF THE DRAWINGS

FIG. 3 depicts the relationship of FIGS. 4 and 5.

FIG. 4 depicts a first portion of a flowchart of the operation of data processing system 101 in accordance with the illustrative embodiment.

FIG. 5 depicts a second portion of a flowchart of the operation of data processing system 101 in accordance with the illustrative embodiment.

DETAILED DESCRIPTION

Figure 1:
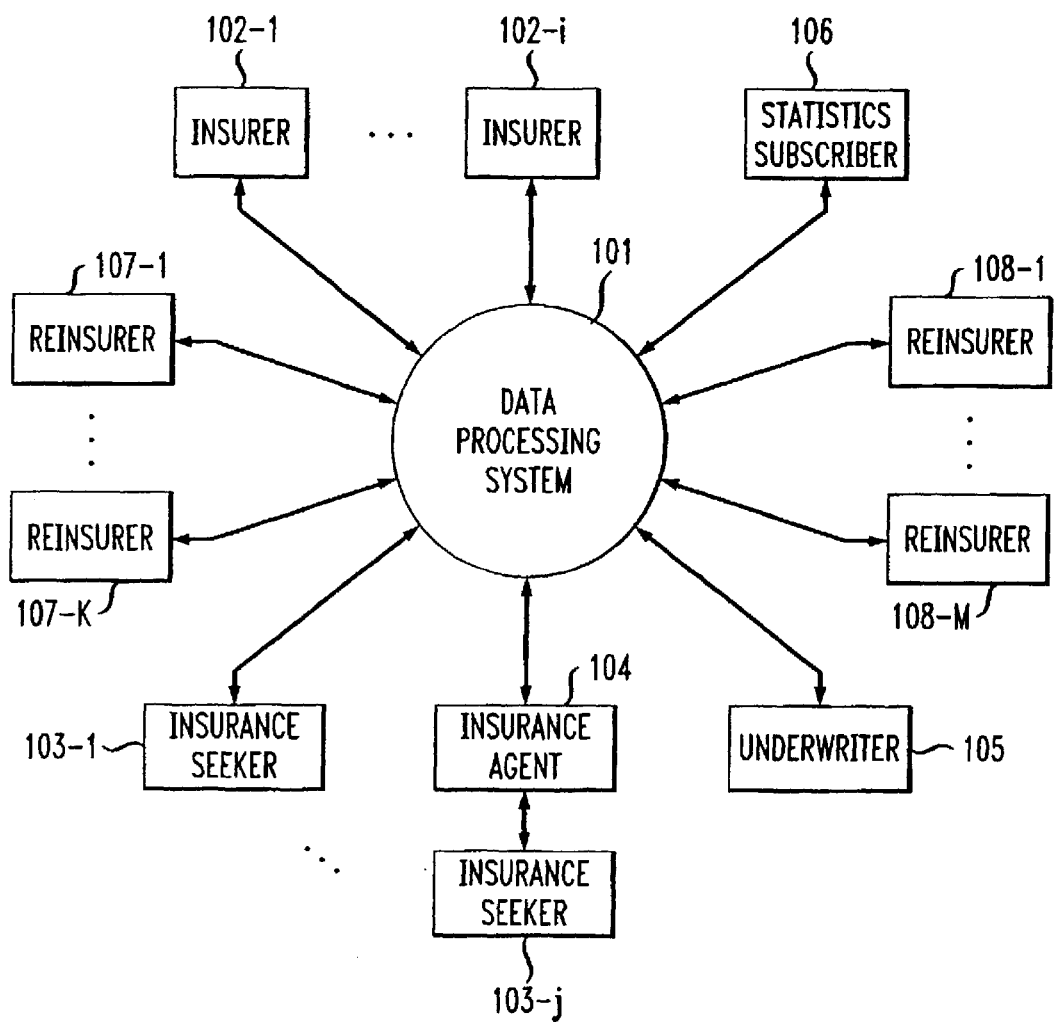
FIG. 1 depicts a schematic diagram of the illustrative embodiment of the present invention.

FIG. 1 depicts a schematic diagram of the illustrative embodiment of the present invention in which data processing system 101 provides a market for: (1) the provision of insurance by a plurality of insurers (e.g., insurers 102-1 through 102-$i$) to a plurality of insurance seekers (e.g., insurance seekers 103-1 through 103-$j$), and (2) the reinsurance of existing policies by a plurality of reinsurers (e.g., reinsurers 107-1 through 107-$k$) to a plurality of reinsurees (e.g., reinsurees 108-1 through 108-$m$).

For the purposes of this specification, an "insurer" is defined as an entity that provides, or endeavors to provide, insurance to an insurance seeker, and an "insurance seeker" is defined as an entity that seeks insurance. When an insurer and an insurance seeker enter into a binding contract or "policy" for insurance, the insurance seeker becomes an "insured."

Furthermore, for the purposes of this specification, "insurance" is defined as a contractual obligation that binds an insurer to indemnify an insured against a specified loss in consideration for premiums, and "reinsurance" is defined as the transference in whole, or in part, of a risk or contingent liability covered under an existing contract from a reinsuree to a reinsurer. For the purposes of this specification, a "reinsurer" is defined as an entity that acquires a risk or contingent liability in whole, or in part, covered under an existing contract from a reinsuree, and a "reinsuree" is defined as an entity that transfers a risk or contingent liability in whole, or in part, covered under an existing contract to a reinsurer.

In accordance with the illustrative embodiment of the present invention, one or more insurance agents (e.g., insurance agent 104) and one or more underwriters (e.g., underwriter 105) might be engaged to facilitate the provision of insurance between insurers and insurance seekers. For the purposes of this specification, an "insurance agent" is defined as an entity that prepares an insurance solicitation (e.g., by filling out the paperwork, by entering the insurance seeker's pertinent information into data processing system 101 via a computer terminal, etc.). Although a sophisticated insurance seeker can act as its own insurance agent, it might be desirable for a less sophisticated insurance seeker to have another entity act as an insurance agent. For the purposes of this specification, an "insurance solicitation" is defined as an application for or inquiry regarding insurance or both. The types and nature of the data contained in an insurance solicitation are discussed below.

For the purposes of this specification, an "underwriter" is defined as an entity that evaluates an insurance solicitation against an underwriting standard for compliance with the underwriting standard. Although insurers often act as their own underwriters, an insurer might employ another entity to act as underwriter. Furthermore, because many entities in the insurance industry are large and sophisticated, it is common for a single entity to perform different roles at different times or with respect to different transactions. Therefore, for the purposes of this specification, a single entity can be:
(i) an insurer, or
(ii) a reinsurer, or
(iii) a reinsuree, or
(iv) an underwriter, or
(v) an insurance agent, or
(vi) an insurance seeker, or
(vii) any combination of i, ii, iii, iv, v and vi.

The heart of the illustrative embodiment is data processing system 101, which receives data from each insurer, insurance seeker, reinsurer, reinsuree, insurance agent and underwriter and endeavors to match insurers with appropriate insurance seekers and reinsurers with appropriate reinsurees. Each insurer, insurance seeker, reinsurer, reinsuree, insurance agent, and underwriter is advantageously capable of providing data to and receiving data from data processing system 101 via a data network (e.g., the Internet, etc.) or via a telephone network (e.g., the Public Switched Telephone Network, etc.) or both.

Figure 2:
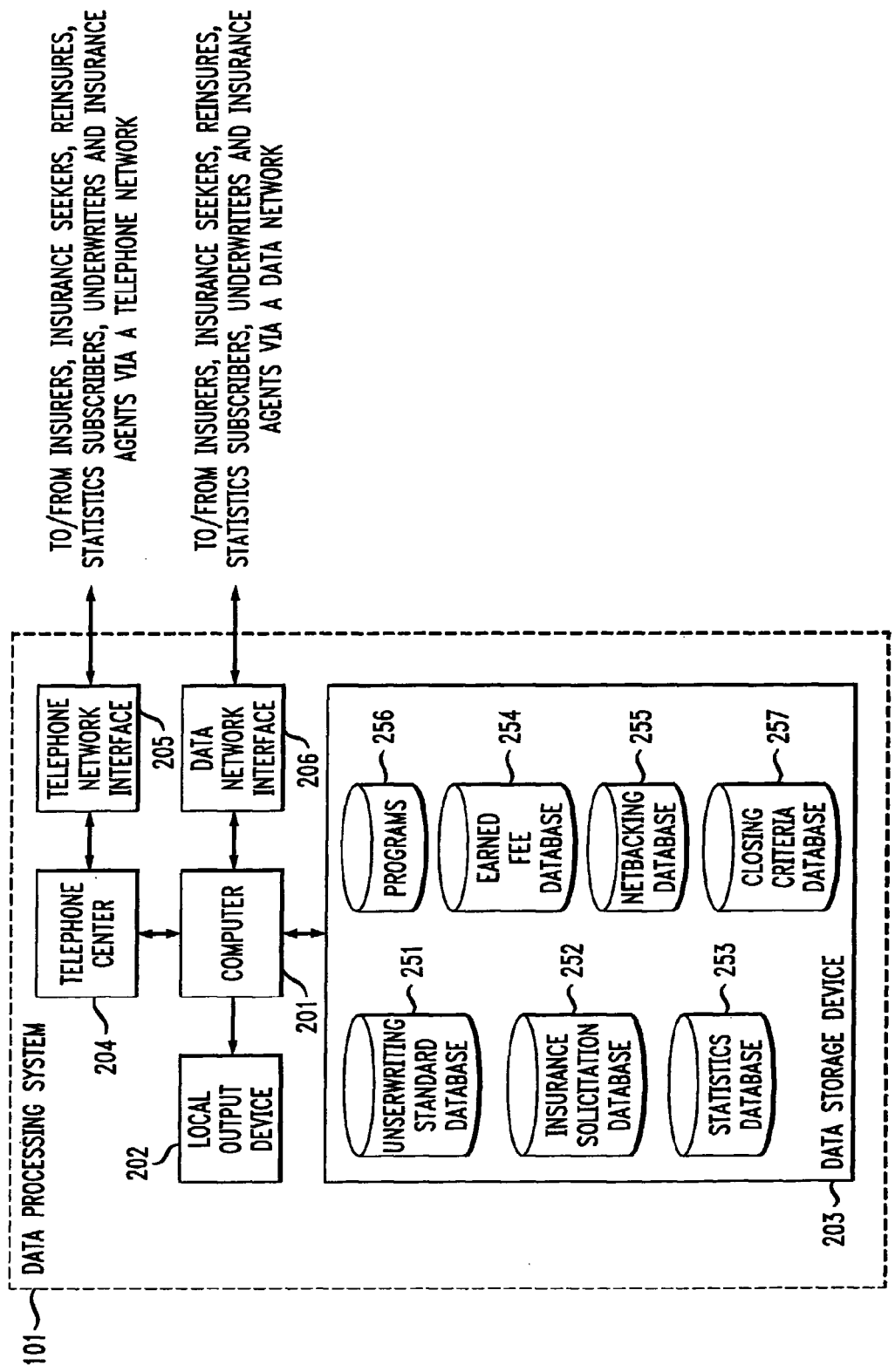
FIG. 2 depicts a block diagram of data processing system 101 depicted in FIG. 1.

FIG. 2 depicts an illustrative embodiment of data processing system 101, which comprises: computer 201, local output device 202, data storage device 203, telephone center 204, telephone network interface 205, and data network interface 206. Computer 201 is advantageously a general-purpose computer as is well-known in the art that is capable of:
executing one or more programs that are stored in data storage device 203;
storing data in and retrieving data from data storage device 203;
outputting data to local output device 202;
receiving data from and outputting data to telephone center 204; and
receiving data from and outputting data to data network interface 206.

Local output device 203 is a device (e.g., a printer, a tape drive, removable hard disk, etc.) from which data from data processing system 101 can be output for processing or delivery to insurers, insurance seekers, insurance agents, underwriters, reinsurers, reinsurees, and statistics subscribers.

Data storage device 203 is advantageously a non-volatile memory, such as a hard disk, for storing the program code executed by computer 201 and the data input into and generated by the illustrative embodiment.

Data network interface 206 enables insurers, insurance seekers, insurance agents, underwriters, reinsurers, reinsurees, and statistics subscribers to communicate with data processing system 101 via a data network, such as the Internet. For example, data processing system 101 can be accessed via the World Wide Web.

Alternatively, insurers, insurance seekers, insurance agents, underwriters, reinsurers, reinsurees, and statistics subscribers can communicate with data processing system 101 via telephone, such as through a toll-free "800" number. To this end, telephone network interface 205 advantageously comprises one or more telephones that are capable of receiving calls from and placing calls to insurers, insurance seekers, insurance agents, underwriters, reinsurers, reinsurees, and statistics subscribers. Telephone network interface 205 can further comprise an automatic call distribution system, in well-known fashion, for routing incoming calls to the various telephones. Furthermore, telephone network interface 205 is advantageously capable of receiving information from insurers, insurance seekers, insurance agents, underwriters, reinsurers, reinsurees, and statistics subscribers via a touch-tone interface wherein the parties input information to the system by pushing the buttons on their telephones in response to questions from an automated operator.

Telephone center 204 advantageously comprises one or more computer terminals that are operated by the personnel associated with telephone network interface 205 such that an operator (either human or automated) can shuttle data between computer 201 and an insurer, insurance seeker, insurance agent, underwriter, reinsurer, reinsuree, or statistics subscriber who is in contact with data processing system 101 via telephone network interface 205.

It will be clear to those skilled in the art how to make and use computer 201, local output device 202, data storage device 203, telephone center 204, telephone network interface 205, and data network interface 206. Although data processing system 101 is shown as depicting only one computer and one storage device, it will be clear to those skilled in the art that a data processing system in accordance with the present invention can also comprise one or more computers and one or more storage devices.

FIG. 3 depicts the relationship of FIGS. 4 and 5, and FIG. 4 depicts a first portion of a flowchart of the operation of data processing system 101 in accordance with the illustrative embodiment.

At step 301, each of a plurality of insurers inputs into data processing system 101, via a data network and data network interface 206 or via a telephone network and telephone network interface 205, an indicium of:

i. each insurance product that an insurer is endeavoring to provide (e.g., flood insurance, health insurance, life insurance, etc.); and
  ii. an underwriting standard for each insurance product; and
  iii. the premiums, fees, and terms for each product insurance.

For example, Insurer A can input into data processing system 101 an indicium that indicates that it endeavors to provide: (1) auto liability insurance, (2) auto collision insurance, (3) life insurance, (4) key-man insurance, and (5) disability insurance, and the underwriting standards, premiums, fees and terms by which it endeavors to write such insurance. Although an underwriting standard and premium schedule can be quite complicated and is typically different for each insurer, Table 4 provides an illustrative example of an underwriting standard that one insurer, Insurer A, might input into data processing system 101 for auto liability insurance.

TABLE 4

Underwriting standard for Insurer A for Auto Liability Insurance

| Amount of Coverage | Insurance Seeker's Age | Points on License (for driving infractions) | Premium (per month per thousand dollars coverage) |
|---|---|---|---|
| $25,000–$50,000 | >16 years old | 0 | $2.80 |
| $50,001–$150,000 | >18 years old | ≤2 | $2.25 |
| $100,001–$250,000 | >18 years old | ≤0 | $1.47 |
| $150,001–$500,000 | >21 years old | ≤2 | $0.78 |
| $500,001–$1,000,000 | >25 years old | ≤4 | $0.45 |

In contrast, another insurer, Insurer B, might input into data processing system 101 an indicium that it is endeavoring to provide: (1) auto liability insurance, (2) auto collision insurance and (3) malpractice insurance, wherein the underwriting standard and premium schedule for auto liability insurance is summarized in Table 5.

TABLE 5

Underwriting standard for Insurer B for Auto Liability Insurance

| Amount of Coverage | Insurance Seeker's Age | How Long Ago Was Last Moving Violation | Premium (per month per thousand dollars coverage) |
|---|---|---|---|
| $10,000–$50,000 | >18 years old | >1 year | $3.27 |
| $50,001–$150,000 | >18 years old | >1 year | $1.81 |
| $150,001–$400,000 | >18 years old | >3 years | $1.12 |
| $150,001–$500,000 | >21 years old | >3 years | $0.56 |
| $500,001–$1,000,000 | >27 years old | >5 years | $0.27 |

It should be noted that not only is the underwriting standard for auto liability insurance for Insurer A different than the underwriting standard for Insurer B, but that one of the factors in the underwriting standards is also different. For example, although both Insurer A and Insurer B use the insurance seeker's age as a factor in the underwriting standard, only Insurer A uses the number of points on the insurance seeker's license as a factor. In contrast, only Insurer B uses how long ago was the insurance seeker's last moving violation as a factor in the underwriting standard.

Furthermore, it will be clear to those skilled in the art that the illustrative underwriting standards depicted in Tables 4 and 5 are simple for pedagogical reasons and that the underwriting standards used by other insurers might be more complicated. Furthermore, it will be clear to those skilled in the art how to create and input an underwriting standard into data processing system 101 for one or more types of insurance and reinsurance and for any set of factors, premiums, fees and terms.

Therefore, it should be understood that the illustrative embodiment of the present invention does not set or affect the underwriting standards used by the insurers who patronize the system, but accepts any set of factors that an insurer desires as an underwriting standard.

In accordance with the illustrative embodiment of the present invention, an insurer can input, revise or withdraw any insurance product, underwriting standard, or associated premium, fee or term in data processing system 101 at any time, which enables the insurer to adjust its offerings as its needs, desires and market conditions change.

The list of insurance products, underwriting standards, premiums, fees and terms from each of the plurality of insurers are stored in underwriting standard database 251 in data storage device 203.

At step 302, data processing system 101 compiles statistics on the list of insurance products, underwriting standards, premiums, fees and terms received from each of the plurality of insurers. Such statistics might include, but are not limited to:

the number of insurers who have underwriting standards pending in data processing system 101;
  the number of insurers who are endeavoring to provide each insurance product;
  any standard, premium, fee or term as a function of any other standard, premium, fee or term—to answer questions such as "What is the lowest premium cited in an underwriting standard for auto liability insurance for $86,000 of coverage in Manhattan to an insurance seeker who is 47 years old and who has 9 points on its license?" and "What is the greatest amount of auto liability coverage available to an insurance seeker who is 19 years old?"
  the factors for any insurance product—to answer questions such as "What are all of the individual factors considered by all of the insurers endeavoring to provide auto liability insurance?"

It will be clear to those skilled in the art how to compile such statistics from the underwriting standards received. Advantageously, step 302 is performed each time a new insurance product, underwriting standard, premium, fee or term is received by data processing system 101 or is revised or withdrawn by an insurer.

The statistics compiled at step 302 are stored in statistical database 253 in data storage device 203. Because the statistics stored in statistical database 253 are valuable, they can be sold or provided as described below with respect to step 312.

At step 303, an insurance solicitation is received at data processing system 101 from each of a plurality of insurance seekers. Each insurance solicitation can be received at data processing system 101 via a data network and data network interface 206 or via a telephone network and telephone network interface 205. Furthermore, each insurance solicitation can be a mere inquiry into the availability of insurance, its premiums, fees, and terms, or it can be an offer to enter into a binding policy.

Each insurance solicitation can be received at data processing system 101 directly from an insurance seeker or indirectly through an entity that acts as an insurance agent for the insurance seeker or insurer. In either case, a record is kept in netbacking database 255 of whether an insurance agent is used, and if so, who the insurance agent is. The purpose of keeping a record of whether an insurance agent is used is to ensure that the insurance agent is compensated for its service, as discussed in detail below with respect to step 310.

Advantageously, each insurance solicitation is received in the form of answers to a series of questions, which questions are based, at least in part, on the statistics compiled in step 302. In particular, the questions are designed to elicit answers that enable data processing system 101 to determine how well the insurance solicitation satisfies the underwriting standard from each insurer. In other words, the questions are designed to provide data processing system 101 with that necessary data to enable it to match, if possible, each insurance seeker to the most appropriate insurer.

For example, if the two insurers, Insurer A and Insurer B discussed above, are the only two insurers who have indicated the desire to provide insurance into data processing system 101, then the two insurers, in aggregate, are endeavoring to provide the six types of insurance shown in Table 6.

TABLE 6

Types of Insurance Available From All Patronizing Insurers disability insurance
auto collision insurance
auto liability insurance
life insurance
key-man insurance
malpractice insurance Therefore, the first piece of data sought in an insurance solicitation might be designed to identify the insurance product that the insurance seeker is seeking. For example, the first question put to an insurance seeker might be "What insurance product are you interested in—disability insurance, auto collision insurance, auto liability insurance, life insurance, key-man insurance, or malpractice insurance?"

The subsequent data sought in the insurance solicitation advantageously enables data processing system 101 to determine whether the insurance seeker satisfies the underwriting standard for the insurance product sought, and if multiple insurers endeavor to provide insurance of that type, who the most appropriate insurer is.

For example, if the insurance solicitation indicates that the insurance seeker is interested in $300,000 coverage of auto liability insurance, then data processing system 101 must ascertain whether the insurance seeker is qualified for such coverage from either Insurer A or Insurer B or both (because both Insurer A and Insurer B endeavor to provide such insurance).

To this end, and given the underwriting standard in Tables 4 and 5, above, the following questions, among others, might be put to the insurance seeker to determine if the insurance seeker satisfies either or both underwriting standards:

1) How old are you?
2) How many points are on your license?
3) How long ago was your last moving violation?

Although question #3 is only relevant to the underwriting standard for Insurer B and question #2 is only relevant to the underwriting standard for Insurer A, both questions are advantageously asked and their answers received and stored in insurance solicitation database 252.

To reiterate, the data sought in an insurance solicitation is designed to enable data processing system 101 to match, if possible, each insurance solicitation from each insurance seeker to the most appropriate insurer, by, for example, cost and coverage.

At step 304, data processing system 101 compiles statistics on the insurance solicitations received. Such statistics might include, but are not limited to:

the number of insurance solicitations received for each insurance product in a given interval;

the total dollar volume of insurance solicitations received for each insurance product; and any aspect of any insurance solicitation as a function of any other aspect—to answer questions such as "What is the total dollar volume of the insurance solicitations received in the last 6 days from insurance seekers seeking auto liability insurance for $200,000 or more in New Jersey?"

It will be clear to those skilled in the art how to compile such statistics. Advantageously, step 304 is performed each time a new insurance solicitation is received by data processing system 101.

The statistics compiled at step 304 are stored in statistical database 253 in data storage device 203. Because the statistics stored in statistical database 253 are valuable, they can be sold or provided as described below with respect to step 312.

At step 305, data processing system 101 compares each insurance solicitation received in step 303 to the underwriting standards stored in underwriting standard database 251 to identify, if possible, (1) a selected insurer, and (2) a prioritized list of alternative insurers, including a first alternative insurer.

In other words, data processing system 101 endeavors to find one or more insurers who, based on the underwriting standards in underwriting standard database 251 are satisfied by the insurance solicitation received in step 303. There are three possible outcomes of step 305:

1. The insurance solicitation does not satisfy any underwriting standard;

2. The insurance solicitation satisfies only one underwriting standard; or

3. The insurance solicitation satisfies two or more underwriting standards.

Case #1—In the first case, when the insurance solicitation does not satisfy any underwriting standard, data processing system 101 informs the insurance seeker of such (or the insurance agent if one is used) and the reasons why the insurance solicitation is unsatisfactory. As an example of the first case, assume that an insurance seeker, Insurance seeker #1, provides the insurance solicitation depicted in Table 7.

TABLE 7

| Insurance solicitation from Insurance seeker #1 | |
| --- | --- |
| Insurance Product Sought | Auto Liability Insurance |
| Amount of Coverage | $400,000 |
| Age of Insurance Seeker | 16 |
| Number of Points on License | 13 |
| Length of Time Since Last Moving Violation | 3 weeks |

By comparing the data in Table 7 to the underwriting standard in Tables 4 and 5, it can be readily observed that insurance seeker #1 does not satisfy the underwriting standard of either Insurer A or Insurer B (the insurance seeker has too many points and its last moving violation was too recent). Therefore, data processing system 101 informs the insurance seeker of such and advantageously also informs the insurance seeker why its insurance solicitation did not satisfy any underwriting standard.

Case #2—In the second case, when the insurance solicitation satisfies only one underwriting standard, the associated insurer is designated as the "selected insurer" by data processing system 101. Data processing system 101 then, at step 306, advantageously outputs:
  i. (to the selected insurer) an indicium of the identity of the insurance seeker; or
  ii. (to the selected insurer) all or a portion of the insurance solicitation; or
  iii. (to the insurance seeker) an indicium of the identity of the selected insurer; or
  iv. (to the insurance seeker) an indicium of the premium, fees, and terms cited in the underwriting standard satisfied by the insurance solicitation; or
  v. any combination of i, ii, iii and iv.

The selected insurer and the insurance seeker then interact, either through data processing system 101 or not, as necessary or desirable, to write the insurance policy (i.e., enter into a binding contract for insurance coverage). If the selected insurer desires to engage the services of an underwriter (e.g., underwriter 105) to facilitate the writing of the policy, that fact, and the identity of the underwriter is conveyed to data processing system 101 and stored in netbacking database 255. The function performed by an underwriter in this case is to collect the appropriate documentation from the insurance seeker and to ensure that the data provided by the insurance seeker in the insurance solicitation is, in fact, truthful, correct and complete. The purpose of keeping a record of whether an underwriter is used is to ensure that the underwriter is compensated for its service. This is discussed in detail below with respect to step 310.

As an example of the second case, assume that an insurance seeker, Insurance seeker #2, provides the insurance solicitation depicted in Table 8.

TABLE 8

| Insurance solicitation from Insurance seeker #2 | |
| --- | --- |
| Insurance Product Sought | Auto Liability Insurance |
| Amount of Coverage | $600,000 |
| Age of Insurance Seeker | 26 |
| Number of Points on License | 3 |
| Length of Time Since Last Moving Violation | 9 years ago |

By comparing the data in Table 5 to the underwriting standard in Tables 1 and 2, it can be seen that Insurance seeker #2 satisfies the underwriting standard of Insurer A for $600,000 of coverage (which is quoted at $0.45 per month per thousand dollars of coverage). Furthermore, it can be seen that Insurance seeker #2 does not satisfy the underwriting standard of Insurer B for coverage of $600,000 because Insurance seeker #2 is too young (26 years of age is below the 27 years of age required for more than $500,000 in coverage). Therefore, the insurance solicitation only satisfies the underwriting standard from Insurer A and, therefore, data processing system 101 identifies Insurer A as the selected insurer.

Whether the selected insurer and insurance seeker communicate solely through data processing system 101 to write the policy, data processing system 101 advantageously tracks all insurer and insurance seeker communications, document processing steps, written policies as a percentage of insurance solicitations referred and the resulting billings and receipts of the parties. This is useful for, among other things, ensuring that the insurers and insurance seekers do not receive the benefit of data processing system 101 without paying for it.

Furthermore, data processing system 101 maintains a permanent record of the closing criteria for each written policy in closing criteria database 257. For the purposes of this specification, the term "closing criteria" is defined as those attributes of the insurance solicitation and underwriting standard that may be useful at a later time to cost/value or reinsure that insurance policy. The purpose of maintaining the closing criteria for each insurance policy is discussed below with respect steps 313 to 315.

Case #3—In the third case, when the insurance solicitation satisfies two or more underwriting standards from different insurers, data processing system 101 identifies one of those insurers as the selected insurer and the remaining insurers as alternative insurers. Of the insurers whose underwriting standards are satisfied, that insurer that cites the lowest premium and fees and the best terms for the insurance solicitation is identified as the selected insurer.

If there are more than two insurers whose underwriting standards are satisfied by the insurance solicitation and that offer the same premiums, fees, and terms for a given insurance product, data processing system 101 advantageously selects the chronologically first to offer that set of premiums, fees, and terms as the selected insurer. This convention further induces insurers to lower premiums and fees and to improve their terms quickly, which contributes to the efficiency of the market.

Alternatively, if there are more than two insurers whose underwriting standards are satisfied by the insurance solicitation and that offer the same premium, fees, and terms for a given insurance product, data processing system 101 can alternately designate one insurer and then the others, in round-robin fashion, as the selected insurer. And as a third alternative, if there are more than two insurers whose underwriting standards are satisfied by the insurance solicitation and that offer the same premium, fees, and terms for a given insurance product, data processing system 101 can randomly designate one insurer as the selected insurer.

For the purposes of this specification, the "first alternative insurer" is defined as that insurer whose underwriting standard is satisfied by the insurance solicitation but that offers the next best premiums, fees and terms after the selected insurer.

The advantage of identifying the alternative insurer arises when, for any reason, the selected insurer is unable or unwilling to provide the sought after insurance despite the satisfactory insurance solicitation. If the selected insurer fails to provide insurance (through no fault of the insurance seeker), then the selected insurer might be punished by a fine payable to either data processing system 101 or to the disappointed insurance seeker or both. In the event that a selected insurer does not provide the insurance, it is stricken as the selected insurer and the first alternative insurer is promoted and becomes identified as the selected insurer. The newly identified selected insurer and the insurance seeker then endeavor to write the policy.

Data processing system 101 then, at step 306, advantageously outputs:
  i. (to the selected insurer) an indicium of the identity of the insurance seeker; or
  ii. (to the selected insurer) all or a portion of the insurance solicitation; or
  iii. (to the insurance seeker) an indicium of the identity of the selected insurer; or
  iv. (to the insurance seeker) an indicium of the premium, fees, and terms cited in the underwriting standard satisfied by the insurance solicitation; or
  v. (to the insurance seeker) an indicium of the identity of the alternative insurers; or
  vi. (to the insurance seeker) an indicium of the premium, fees, and terms cited in the underwriting standard satisfied by the insurance criteria from each of the alternative insurers; or
  vii. any combination of i, ii, ii, iv, v, and vii.

As an example of the third case, assume that an insurance seeker, Insurance seeker #3, provides the insurance solicitation depicted in Table 9.

TABLE 9

Insurance solicitation from Insurance seeker #2

| Insurance Product Sought | Auto Liability Insurance |
|---|---|
| Amount of Coverage | $100,000 |
| Age of Insurance Seeker | 46 |
| Number of Points on License | 0 |
| Length of Time Since Last Moving Violation | 9 years ago |

By comparing the data in Table 9 to the underwriting standard in Tables 4 and 5, it can be seen that Insurance seeker #3 satisfies the underwriting standard for both Insurer A and Insurer B. For such an insurance solicitation, Insurer A quotes a $1.47 premium and Insurer B quotes $1.81 premium. Therefore, because the premium cited by Insurer A is lower than that of Insurer B, data processing system 101 identifies Insurer A as the selected insurer and Insurer B as the first alternative insurer (assuming that the other fees and terms are comparable).

At step 307, data processing system 101 compiles statistics on the matching of insurance solicitations to underwriting standards, and of the failure to match insurance solicitations to underwriting standards. Such statistics might include, but are not limited to:
  the number of matches for each insurance product in a given interval;
  the total dollar volume of the matches for each insurance product; and
  any aspect of any match as a function of any other aspect—to answer questions such as "What is the average premium of the matches made in the last hour from insurance seekers seeking auto liability insurance in California who are 21 years old?"

It will be clear to those skilled in the art how to compile such statistics. Advantageously, step 307 is performed each time a match is made between an insurance solicitation and an underwriting standard and each time there is a failure to match an insurance solicitation to an underwriting standard.

The statistics compiled at step 307 are stored in statistical database 253 in data storage device 203. Because the statistics stored in statistical database 253 are valuable, they can be sold or provided as described below with respect to step 312.

At step 308, data processing system 101 receives an indicium that a fee has been earned by data processing system 101 with respect to a transaction involving each insurer and insurance seeker. Typically, the indicium is received from the insurer, but alternatively it can be received by the insurance seeker, the insurance agent or the underwriter. Advantageously, a fee is earned from and paid by the selected insurer or from the insurance seeker or both. Advantageously, the fee is earned when the insurer and insurance seeker enter into a contract for insurance. In an alternative embodiment of the present invention, the fee is earned for merely introducing the insurance seeker and the selected insurer in step 306.

Advantageously, the fee is based on the dollar volume of the policy written or on the size of the premiums or both, and the indicium of the fee is stored in earned fee database 254 in data storage device 203. The fee information is valuable because it enables data processing system 101 to determine how to remit fees and to distribute the statistics in database 253. More is said about this in steps 309 through 312.

At step 309, data processing system 101 compiles statistics on the fees earned, if any, from transactions associated with each insurance seeker and insurer. Such statistics might include, but are not limited to:
  a measure of the aggregate fees earned in a given interval from transactions in which a given insurer has provided the insurance; and
  a measure of the fees earned as a function of any aspect of any underwriting standard or insurance solicitation—to answer questions such as "What are the fees earned on insurance solicitations for auto liability insurance for $200,000 or more in New Jersey in the last 28 days?"

It will be clear to those skilled in the art how to compile such statistics. Advantageously, step 309 is performed each time an indicium of a fee is received by data processing system 101 (step 308).

The statistics compiled at step 309 are stored in statistical database 253 in data storage device 203. Because the statistics stored in statistical database 253 are valuable, they can be sold or provided as described below with respect to step 312.

At step 310, data processing system 101 computes and outputs an indicium of the portion of the fee earned in step 308 that is earned by, and is to be paid to, each of:
  (1) the insurance seeker;
  (2) the insurance agent, if any; and
  (3) the underwriter, if any.

In all cases, the remittance of some portion of the fee earned by data processing system 101 to each of these parties is made not only to compensate the party for the services it has performed, but also to encourage and reward the parties for facilitating the writing of policies through data processing system 101 (which contributes to the efficiency of the overall market).

With regard to the insurance seeker, a portion of the earned fee may be provided to the insurance seeker based on the total dollar volume of the fees earned by data processing system 101 from transactions associated with the insurance seeker during a given interval (e.g., the total fees earned from three transactions in which the insurance seeker gets auto insurance, health insurance and homeowner's insurance through data processing system 101 from three different insurers, etc.). In other words, the insurance seeker should be rewarded for its patronage of data processing system 101. The statistics compiled in step 309 are useful in determining the amount of the fee earned by the insurance seeker.

Furthermore, if the insurance seeker acts as its own insurance agent, then the insurance seeker lowers the cost of doing business for the insurer and should be rewarded for doing so. Therefore, the remittance of a portion of the earned fee to the insurance seeker encourages the insurance seeker to act as its own insurance agent.

With regard to an insurance agent who acts as an agent for the insurance seeker (if one is engaged), a portion of the fee earned by data processing system 101 is paid to the insurance agent for its service in assisting the insurance seeker in preparing the insurance solicitation. Furthermore, because the insurance agent and not the insurance seeker may make the decision to patronize data processing system 101, the insurance agent is advantageously given an origination fee for choosing data processing system 101. The size of the origination fee may vary, for example, based on the total dollar volume of the fees earned by data processing system 101 from transactions associated with the insurance agent during a given interval. The statistics compiled in step 309 are useful in determining the amount of the fee earned by the insurance agent.

With regard to the underwriter (if one is engaged with regard to a particular insurer), a portion of the earned fee is remitted back to the underwriter for its service in facilitating the writing of the policy. Furthermore, to encourage the underwriter to expedite the writing of the policy involving data processing system 101, an additional portion of the earned fee is advantageously provided to the underwriter based on the total dollar volume of the fees earned by data processing system 101 from transactions associated with the underwriter during a given interval. The statistics compiled in step 309 are useful in determining the amount of the fee earned by the underwriter.

As shown in FIG. 5, at step 311, data processing system 101 outputs an indicium of a portion of the fee, if any, to be remitted to each insurer. The purpose of remitting a portion of the fee to the selected insurer is to encourage each insurer to:
(i) patronize data processing system 101;
(ii) offer the widest variety of insurance products at the lowest premiums and fees and with the best terms; and
(iii) write the largest number of policies possible through the system.

To this end, the amount of the fee to be remitted is advantageously dependent on: (i) the measure of fees earned by data processing system 101 from transactions in a given interval in which the insurer has provided the insurance, and (ii) a graduated schedule (e.g., Table 1 above, etc.). For example, if less than $1,000,000 in fees are earned by data processing system 101 from transactions in which a given insurer has provided the insurance within the last month, then only 15% of the earned fee is remitted to the insurer. In contrast, if more than $5,000,000 in fees are earned by data processing system 101 from transactions in which a given insurer has provided the insurance within the last month, then 35% of the earned fee is remitted. The statistics compiled in step 309 are useful in determining the amount of the fee to be remitted to the selected insurer.

Furthermore, at step 311, data processing system 101 outputs an indicium of a portion of the fee, if any, to be credited to each insurer, which credit can be applied against the fees incurred by the insurer in reinsuring (i.e., being either the reinsurer, the reinsuree or both) through data processing system 101. The purpose of crediting a portion of the fee is to further encourage the insurer to:

(i) patronize data processing system 101;
(ii) offer the widest variety of insurance products at the lowest premiums and fees and with the best terms;
(iii) write the largest number of policies possible with the assistance of data processing system 101; and
(iv) reinsure through data processing system 101.

The amount of the fee to be remitted back is also advantageously dependent on: (i) the measure of fees earned by data processing system 101 from transactions in a given interval in which the insurer has provided the insurance, and (ii) a graduated schedule (e.g., Table 3 above, etc.). It will be clear to those skilled in the art how to compute and output an indicium of the fee to be remitted back to each insurer and how to compute and output an indicium of the fee to be credited to each insurer against fees incurred for reinsuring through data processing system 101.

At step 312, data processing system 101 outputs some or all of the statistics stored in statistics database 253. It will be clear to those skilled in the art that the "statistics" provided can include raw data as well as information about the raw data. Advantageously, some parties are given the statistics in real-time, while others are given them delayed by some duration (e.g., 15 minutes, 24 hours, etc.). Typically, the statistics in real-time will be considered more valuable than the statistics that are delayed. Furthermore, some parties might be given more statistics than others.

Although some or all of the statistics can be sold for cash, the statistics are advantageously given for free or at a subsidized price to those patrons (e.g., the insurers, insurance seekers, reinsurers, reinsurees, etc.) who actually write policies and reinsure through data processing system 101. The decision whether to output statistics to a patron in real-time or not and for free or for a subsidized price is advantageously made based on the amount of fees earned from transactions involving that patron in a given interval. The data stored in earned fee database 254 and netbacking database 255 are useful for this purpose.

In steps 313 through 319, data processing system 101 functions as a market for reinsurance between reinsurers and reinsurees, for which data processing system 101 earns a fee. In general, it will be to the advantage of the reinsurers and reinsurees if they base their bids and offers to reinsure at least partially on the statistics output to them in step 312. Otherwise, they are likely to be arbitraged by other entities that do.

Furthermore, the fees earned by data processing system 101 from reinsurers and reinsurees are advantageously considered by data processing system 101 in determining the price, timeliness, and completeness of the statistics offered to the reinsurer in step 312.

At step 313, data processing system 101 receives a bid to buy reinsurance at a bid price from each of a plurality of reinsurers. For the purposes of this specification, the "buying" of reinsurance is defined as the transferring in whole, or in part, of the risk associated with one or more existing insurance contracts to a reinsurer from a reinsuree in return for the provision some consideration.

Advantageously, each bid to buy either:
1) describes each insurance policy for which reinsurance is sought in terms of its closing criteria, or
2) identifies each insurance policy for which reinsurance is sought so that a potential reinsurer can retrieve the policy's closing criteria from closing criteria database 257.
In either case, this facilitates the reinsurance of policies by enabling each potential reinsurer to evaluate the cost/value of each individual policy by its own underwriting standards.

At step 314, data processing system 101 compiles statistics on the bids to buy reinsurance in step 313. The statistics might include, but are not limited to:

What is the total dollar volume of all of the reinsurance bid to buy?

Any function of any bid to buy as a function of any other function—to answer questions such as "What is the lowest premium bid to assume 10% of the liability in a pool of 100 flood insurance policies in New Jersey to insureds who live on flood plains?"

It will be clear to those skilled in the art how to compile such statistics, which are stored in statistics database 253. Advantageously, the statistics are re-compiled each time a new bid to buy is received from a reinsuree.

The statistics compiled at step 314 are stored in statistical database 253 in data storage device 203. Because the statistics stored in statistical database 253 are valuable, they can be sold or provided as described with respect to step 312.

At step 315, data processing system 101 receives an offer to sell reinsurance at an offering price from each of a plurality of reinsurers. For the purposes of this specification, the "selling" of reinsurance is defined as the accepting in whole, or in part, of the risk associated with one or more existing insurance contracts by a reinsurer from a reinsuree in return for the provision some consideration. Advantageously, the offer to sell specifies the minimum acceptable closing criteria for each of the insurance policies that the reinsurer is willing to reinsure and the offer to sell price is based by the reinsurer on the statistics received by the reinsurer in step 312.

At step 316, data processing system 101 compiles statistics on the offers to sell received in step 315. The statistics might include, but are not limited to:

What is the total dollar volume of all of the reinsurance offered to be sold?

Any function of the offer to sell as a function of any other function—to answer questions such as "What is the lowest price offered for 20% liability for a pool of 400 flood policies in New York to insureds who live on flood plains?"

It will be clear to those skilled in the art how to compile such statistics, which are stored in statistics database 253. Advantageously, the statistics are re-compiled each time a new offer to sell is received by a reinsurer.

The statistics compiled at step 316 are stored in statistical database 253 in data storage device 203. Because the statistics stored in statistical database 253 are valuable, they can be sold or provided as described with respect to step 312.

At step 317, data processing system 101 compares each bid to buy reinsurance to each offer to sell reinsurance to identify, if possible, a match between a reinsurer and a reinsuree. It will be clear to those skilled in the art how to compare each bid to buy with each offer to sell.

At step 318, if a match between a reinsurer and a reinsuree is found for the reinsurance of one or more policies, that fact is output from data processing system 101 to both the reinsurer and the reinsuree so that the reinsurance can be consummated.

At step 319, data processing system 101 compiles statistics on sale of reinsurance in step 318. The statistics night include, but are not limited to:

What is the total dollar volume of all of the reinsurance sold in the last 24 hours?

Any function of any reinsurance consummated as a function of any other function—to answer questions such as "What is last price paid to reinsure a pool of 100 auto liability policies in New Jersey to insureds who are 21 years old?"

It will be clear to those skilled in the art how to compile such statistics, which are stored in statistics database 253. Advantageously, the statistics are re-compiled each time a deal for reinsurance is consummated.

The statistics compiled at step 316 are stored in statistical database 253 in data storage device 203. Because the statistics stored in statistical database 253 are valuable, they can be sold or provided as described with respect to step 312.

At step 320, data processing system 101 receives an indicium of the fee earned for brokering the reinsurance. Advantageously, a fee is earned from and paid by both the reinsurer and the reinsuree. In an alternative embodiment, the fee is earned only from the reinsuree, and in another alternative embodiment, the fee is earned only from the reinsurer.

Advantageously, the fee is based on the dollar volume of the reinsurance, and the indicium of the fee earned is stored in earned fee database 254 in data storage device 203. The fee information is valuable because it enables data processing system 101 to determine how to distribute the measure of fees and the statistics in statistics database 253 among the various insurers, insurance seekers, insurance agents, reinsurers, reinsurees, underwriters, and data processing system 101.

As stated above with respect to step 311, a portion of the fees incurred in step 320 can be offset by the credit earned in step 311.

After step 320, control figuratively passes to step 301, although it will be clear to those skilled in the art that the steps in FIGS. 4 and 5 need not be performed in order. Rather, many of the steps are advantageously performed in parallel in response to the submissions of underwriting standards, insurance solicitations, offers to sell and bids to buy reinsurance.

It is to be understood that the above-described embodiments are merely illustrative of the present invention and that many variations can be devised by those skilled in the art without departing from the scope of the invention. It is therefore intended that such variations be included within the scope of the following claims and their equivalents.

What is claimed is:

1. Apparatus for providing an efficient market for insurance and reinsurance, comprising:

a data processing system having one or more program executing computers, a data storage device, and an output device;

a plurality of insurance underwriting standards data records stored in said data storage device containing insurance underwriting standards from a plurality of insurers;

computer programs executing on the one or more program executing computers of said data processing system for:

compiling statistics regarding said plurality of stored data records containing insurance underwriting standards, said statistics data records being derived from said plurality of stored data records and not from a specific data record, and storing statistics data records in said data storage device;

providing from said data processing system said statistics to a reinsurer;

calculating a price to the reinsurer for providing said statistics data records in which the price is reduced for fees obtained from transactions associated with the reinsurer in accordance with a predetermined netbacking schedule stored in a netbacking database, said netbacking schedule defining a discount where increasing numbers of transactions executed through the system by the reinsurer generate discounts in the price to the reinsurer for the purchase of statistics data records, whereby said discount is determined by a product volume which is different from the product where the discount is given.

2. The apparatus of claim 1, further comprising:
computer programs executing on said data processing system for compiling reinsurance statistics regarding reinsurance offer data records; and storing reinsurance statistics data records in said data storage device.

3. The apparatus of claim 2, further comprising:
providing from said data processing system said reinsurance statistics data records to a reinsurer;
calculating a price to the reinsurer for providing said reinsurance statistics data records in which the price is reduced for fees obtained from transactions associated with the reinsurer.

4. Apparatus for providing an efficient market for insurance and reinsurance, comprising:
a data processing system having one or more program executing computers, a data storage device, and an output device;
a plurality of insurance underwriting standards data records stored in said data storage device containing insurance underwriting standards from a plurality of insurers;
computer programs executing on the one or more program executing computers of said data processing system for:
compiling statistics regarding said plurality of stored data records containing insurance underwriting standards, said statistics data records being derived from said plurality of stored data records and not from a specific data record, and storing statistics data records in said data storage device;
receiving insurance solicitation data records in said data storage device;
comparing said insurance solicitation data records to said insurance underwriting standards data records from said plurality of insurers to identify one or more insurers and to provide data records identifying said insurance seeker to said insurer;
providing from said data processing system said statistics to a reinsurer; and
calculating a price to the reinsurer for providing said statistics data records in which the price is reduced for fees obtained from transactions associated with the reinsurer in accordance with a predetermined netbacking schedule stored in a netbacking database, said netbacking schedule defining a discount where increasing numbers of transactions executed through the system by the reinsurer generate discounts in the price to the reinsurer for the purchase of statistics data records, whereby said discount is determined by a product volume which is different from the product where the discount is given.

5. The apparatus of claim 4 further comprising:
computer programs executing on said data processing system for providing from said data processing system said statistics data records to a selected insurer; and calculating a price to the selected insurer for providing said statistics data records in which the price is reduced for fees obtained from transactions associated with the selected insurer.

6. The apparatus of claim 4, further comprising computer programs executing on said data processing system for:
receiving insurance pool data records from one or more insurers;
receiving reinsurance offer data records from one or more reinsurers;
comparing said reinsurance offer data records with said insurance pool data records to identify one or more reinsurers.

7. The apparatus of claim 6 further comprising:
an indicium output by said output device providing an identification of said one or more reinsurers.

8. The apparatus of claim 6 further comprising:
computer programs executing on said data processing system for calculating a fee due from said first reinsurer for brokering the sale of said pool of insurance to said selected reinsurer.

9. The apparatus of claim 6, further comprising:
an indicium output by an output device of said statistics regarding said reinsurance offer data records.

10. The apparatus of claim 6, further comprising calculating a reduced price to the one or more reinsurers for providing said statistics regarding said reinsurance offer data records.

11. The apparatus of claim 10, further comprising computer programs executing on said data processing system for providing from said data processing system said statistics regarding said reinsurance offer data records to a selected reinsurer; and calculating a price for providing said statistics to said selected reinsurer that is based on said fee earned with respect to said selected reinsurer.

12. The apparatus of claim 6, further comprising:
computer programs executing on said data processing system for compiling statistics regarding said reinsurance offer data records and said insurance pool data records.

13. The apparatus of claim 12, further comprising:
an indicium output by an output device of said statistics regarding said reinsurance offer data records and said insurance pool data records.

14. The apparatus of claim 12, further comprising calculating a reduced price to the one or more reinsurers for providing said statistics regarding said reinsurance offer data records and said insurance pool data records.

15. The apparatus of claim 14, further comprising computer programs executing on said data processing system for providing from said data processing system said statistics regarding said reinsurance offer data records and said insurance pool data records to a selected reinsurer; and calculating a price for providing said statistics to said selected reinsurer that is based on said fees earned with respect to said selected reinsurer.

16. A method comprising the steps of:
receiving a plurality of insurance underwriting standards data records from a plurality of insurers at a data processing system having a program executing computer, a data storage device, and an output device and storing the insurance underwriting standards data records in said data storage device;
executing a computer program on the program executing computer of said data processing system for:
(a) compiling a first set of statistics data records in said data processing system based on said plurality of underwriting standards data records from said plurality of insurers, said statistics data records being derived from said plurality of stored data records and not from a specific data record, and storing the first set of statistics data records;
(b) calculating a fee earned with respect to a selected insurer;
(c) providing from said data processing system said first set of statistics data records to a selected insurer;
(d) calculating a price for providing said first set of statistics data records to said selected insurer that is based on said fee earned with respect to said selected insurer in accordance with a predetermined netbacking schedule stored in a netbacking database, said netbacking schedule defining a discount where increasing numbers of transactions executed through the system by the insurer generate discounts in the price to the insurer for the purchase of statistics data records, whereby said discount is determined by a product volume which is different from the product where the discount is given so that said selected insurer can arbitrage insurers who do not have access to said first set of statistics data records.

17. The method of claim 16 wherein said price decreases as said fee increases.

18. The method of claim 16 further comprising:
receiving at said data processing system a plurality of insurance solicitation data records from a plurality of insurance seekers and storing the insurance solicitation data records in said data storage device;
executing a computer program on said data processing system for compiling a second set of statistics data records in said data processing system based on said plurality of insurance solicitation data records from each of the said seekers; and
providing from said data processing system said second set of statistics data records to said selected insurer.

19. The method of claim 16 further comprising the steps of:
providing from said data processing system said first set of statistics data records to a reinsuree; and receiving at said data processing system from said reinsuree a bid to buy reinsurance.

20. The method of claim 16 further comprising:
providing from said data processing system said first set of statistics data records to a reinsurer; and receiving a said data processing system from said reinsurer an offer to sell reinsurance.

21. The method of claim 16 further comprising:
executing computer programs on said data processing system for:
compiling a second set of statistics data records in said data processing system based on said plurality of underwriting standards data records from each of said plurality of reinsurers;
providing from said data processing system said second set of statistics data records to a reinsurer;
and receiving at said data processing system from said reinsurer an offer to sell reinsurance.

22. The method of claim 16, further comprising the step of:
executing computer programs on said data processing system for:
compiling statistics data records in said data processing system based on said plurality of underwriting standards data records from said plurality of insurers;
providing from said data processing system said statistics data records to a first reinsurer;
and receiving at said data processing system from said first reinsurer an offer to sell reinsurance.

23. The method of claim 16, further comprising the steps of:
receiving at said data processing system an insurance solicitation data record from an insurance seeker and storing the insurance solicitation data record in said data storage device;
executing a computer program on said data processing system for comparing in said data processing system said insurance solicitation data record to said underwriting standards data records from said plurality of insurers to identify a selected insurer; and receiving at said data processing system a data record that a fee has been earned with respect to transactions involving said selected insurer.

24. The method of claim 16 further comprising of the step of:
providing from said data processing system a data record that a portion of said fee is to be remitted to said selected insurer.

25. The method of claim 24 wherein said fees are earned from said selected insurer within a given interval.

26. The method of claim 16 further comprising the steps of:
executing computer programs on said data processing system for:
calculating a reduced price to said selected insurer for reinsurance that is based on said fee earned with respect to said selected insurer.

27. The method of claim 26 wherein said fees are earned from said selected insurer within a given interval.

28. A method, comprising the steps of:
receiving a plurality of underwriting standards data records from a plurality of insurers at a data processing system having a program executing computer, a data storage device, and an output device and storing the underwriting standards data records in said data storage device;
executing computer programs on the program executing computer of said data processing system for:
compiling statistics data records in said data processing system based on said plurality of underwriting standards data records from said plurality of insurers, said statistics data records being derived from said plurality of stored data records and not from a specific data record, including a first set of statistics data records based on underwriting standards of a selected insurer, and storing the statistics data records and first set of statistics data records;
receiving at said data processing system an insurance solicitation data record from an insurance seeker;
comparing in said data processing system said insurance solicitation data record to said underwriting standards data records from said plurality of insurers to identify an insurer, being said selected insurer;
receiving at said data processing system an indicium that a fee has been earned with respect to transactions involving said selected insurer;
calculating at said data processing system a fee earned with respect to said selected insurer;
providing from said data processing system said first set of statistics data records to said selected insurer;
calculating a price for providing said first set of statistics data records to said selected insurer that is based on said fee earned with respect to said selected insurer in accordance with a predetermined netbacking schedule stored in a netbacking database, said netbacking schedule defining a discount where increasing numbers of transactions executed through the system by the insurer generate discounts in the price to the insurer for the purchase of statistics data records, whereby said discount is determined by a product volume which is different from the product where the discount is given;
providing from said data processing system said statistics data records to a first reinsurer; and
receiving at said data processing system from said first reinsurer an offer to sell reinsurance.

29. A method, comprising the steps of:
receiving a plurality of underwriting standards data records from a plurality of insurers at a data processing system having one or more program executing computers, a data storage device, and an output device and storing the underwriting standards data records in said data storage device;

executing computer programs on the one or more program executing computers of said data processing system for:

compiling statistics data records in said data processing system based on said plurality of underwriting standards, said statistics data records being derived from said plurality of stored data records and not from a specific data record, and storing the statistics data records;

receiving at said data processing system an insurance solicitation data record from an insurance seeker;

comparing in said data processing system said insurance solicitation data record to said underwriting standards data records to identify a selected insurer;

receiving at said data processing system an indicium that a fee has been earned with respect to transactions involving said selected insurer;

calculating fees earned with respect to said selected insurer;

calculating a price for outputting a first set of statistics data records to said selected insurer that is based on said fees earned with respect to transactions involving said selected insurer within a given interval in accordance with a predetermined netbacking schedule stored in a netbacking database, said netbacking schedule defining a discount where increasing numbers of transactions executed through the system by the insurer generate discounts in the price to the insurer for the purchase of statistics data records, whereby said discount is determined by a product volume which is different from the product where the discount is given;

providing from said data processing system said first set of statistics data records to said selected insurer;

providing from said data processing system said statistics data records to a reinsurer; and receiving at said data processing system from said reinsurer an offer to sell reinsurance.

30. Apparatus for providing an efficient market for insurance and reinsurance, comprising:

a data processing system having a program executing computer, a data storage device, and an output device;

a plurality of insurance underwriting standards data records stored in said data storage device containing insurance underwriting standards from a one or more insurers;

computer programs executing on the program executing computer of said data processing system for:

(a) compiling statistics regarding said plurality of stored data records containing insurance underwriting standards, said statistics data records being derived from said plurality of stored data records and not from a specific data record;

(b) calculating fees earned with respect to the one or more insurers;

(c) calculating a reduced price to the one or more insurers for providing said statistics regarding said stored data records to the selected insurer based on the calculated fees earned with respect to said selected insurer in accordance with a predetermined netbacking schedule stored in a netbacking database, said netbacking schedule defining a discount where increasing numbers of transactions executed through the system by the one or more insurers generate discounts in the price to the one or more insurers for the purchase of statistics data records, whereby said discount is determined by a product volume which is different from the product where the discount is given.

31. The apparatus of claim 30, further comprising:

a plurality of reinsurance offer data records stored in said data storage device containing reinsurance offers from one or more reinsurers;

computer programs executing on said data processing system for:

(a) compiling statistics regarding said stored plurality of reinsurance offer data records containing reinsurance offers, said statistics data records being derived from said stored plurality of reinsurance offer data records and not from a specific data record;

(b) calculating fees earned with respect to the one or more insurers and reinsurers;

(c) calculating a reduced price to the one or more insurers and reinsurers for providing said statistics regarding said statistics regarding said stored data records or said stored reinsurance offer data records to the one or more insurers and reinsurers based on the calculated fees earned with respect to the one or more insurers and reinsurers in accordance with a predetermined netbacking schedule stored in a netbacking database, said netbacking schedule defining a discount where increasing numbers of transactions executed through the system by the one or more insurers or reinsurers generate discounts in the price to the one or more insurers or reinsurers for the purchase of statistics data records, whereby said discount is determined by a product volume which is different from the product where the discount is given.

32. Apparatus for providing an efficient market for insurance and reinsurance, comprising:

a data processing system having a program executing computer, a data storage device, and an output device;

a plurality of reinsurance offer data records stored in said data storage device containing reinsurance offers from one or more reinsurers;

computer programs executing on the program executing computer of said data processing system for:

(a) compiling statistics regarding said plurality of stored reinsurance offer data records containing reinsurance offers, said statistics data records being derived from said stored plurality of reinsurance offer data records and not from a specific data record;

(b) calculating a fees earned with respect to the one or more reinsurers;

(c) calculating a reduced price to the one or more reinsurers for output of said statistics regarding said stored reinsurance offer data records to the one or more reinsurers based on the calculated fees earned with respect to the one or more reinsurers in accordance with a predetermined netbacking schedule stored in a netbacking database, said netbacking schedule defining a discount where increasing numbers of transactions executed through the system by the one or more reinsurers generate discounts in the price to the one or more insurers for the purchase of statistics data records, whereby said discount is determined by a product volume which is different from the product where the discount is given, so that the one or more reinsurer can arbitrage others who do not have access to said statistics regarding said stored reinsurance offer data records.

33. A data processing method operable in connection with an insurance market and an associated reinsurance market, comprising:

receiving a plurality of underwriting standards data records from a plurality of insurers at a data processing system having a program executing computer, a data storage device, and an output device, and storing the underwriting standards data records in said data storage device;

receiving an insurance solicitation data record from an insurance seeker at the data processing system and storing the insurance solicitation data record in said data storage device;

executing computer programs on the program executing computer of said data processing system for:

(a) comparing in said data processing system said insurance solicitation data record to said underwriting standards data records to identify one or more selected insurers;

(b) receiving issued insurance policy data records from selected insurers; and (c) compiling first statistics data records regarding said plurality of insurance policy data records, said first statistics data records being derived from said plurality of insurance policy data records and not from a specific data record;

(d) storing the first statistics data records in said data storage device;

(e) receiving reinsurance offer data records from one or more reinsurers and storing the reinsurance offer data records in said data storage device;

(f) receiving a plurality of insurance pool data records from one or more insurers and storing the insurance pool data records in said data storage device;

(g) comparing said reinsurance offer data records with said plurality of insurance pool data records to identify one or more reinsurers;

(h) compiling second statistics data records regarding said plurality of stored reinsurance offer data records, said second statistics data records being derived from said stored plurality of reinsurance offer data records and not from a specific data record;

(i) calculating a fee earned with respect to a data requestor;

(j) calculating a reduced price to the data requester for providing one or more of the first and second statistics data records based on the fee earned with respect to the data requestor in accordance with a predetermined netbacking schedule stored in a netbacking database, said netbacking schedule defining a discount where increasing numbers of transactions executed through the system by the data requester generates discounts in the price to the data requester for the purchase of statistics data records, whereby said discount is determined by a product volume which is different from the product where the discount is given.

* * * * *